(12) United States Patent
Rahn

(10) Patent No.: US 7,503,253 B2
(45) Date of Patent: Mar. 17, 2009

(54) APPARATUS, SYSTEM AND METHOD FOR INFUSING A PRE-PACKAGED POD

(75) Inventor: Christopher W. Rahn, Virden, IL (US)

(73) Assignee: Bunn-O-Matic Corporation, Springfield, IL (US)

( * ) Notice: Subject to any disclaimer, the term of this patent is extended or adjusted under 35 U.S.C. 154(b) by 499 days.

(21) Appl. No.: 11/055,411

(22) Filed: Feb. 9, 2005

(65) Prior Publication Data

US 2006/0196363 A1 Sep. 7, 2006

(51) Int. Cl.
*A47J 31/00* (2006.01)
(52) U.S. Cl. .............................. 99/280; 99/285; 99/299; 99/305; 99/307; 426/433
(58) Field of Classification Search ................... 99/280, 99/281, 283, 284, 285, 299, 305, 295, 306, 99/307; 426/433
See application file for complete search history.

(56) References Cited

U.S. PATENT DOCUMENTS

| | | | |
|---|---|---|---|
| 4,645,907 A | 2/1987 | Salton | |
| 5,001,969 A | 3/1991 | Moore et al. | |
| 5,083,504 A | 1/1992 | Koga et al. | |
| 5,388,501 A | 2/1995 | Hazan et al. | |
| 5,392,694 A | 2/1995 | Muller et al. | |
| 5,440,972 A * | 8/1995 | English | 99/282 |
| 5,647,055 A * | 7/1997 | Knepler | 392/451 |
| 5,738,001 A * | 4/1998 | Liverani | 99/283 |
| 5,868,062 A * | 2/1999 | Enomoto | 99/282 |
| 6,000,317 A | 12/1999 | Van Der Meer | |
| 6,119,582 A | 9/2000 | Akkerman-Theunisse | |
| 6,245,371 B1 | 6/2001 | Gutwein et al. | |
| 6,465,028 B2 | 10/2002 | Gutwein et al. | |
| 6,799,504 B2 | 10/2004 | Brouwer | |
| 6,829,981 B2 * | 12/2004 | Lassota | 99/299 |
| 7,021,197 B2 * | 4/2006 | Chen et al. | 99/291 |
| 2002/0129712 A1 | 9/2002 | Westbrook et al. | |
| 2004/0231523 A1 | 11/2004 | Kraan | |
| 2004/0250686 A1 * | 12/2004 | Hale | 99/295 |
| 2005/0188854 A1 * | 9/2005 | Green et al. | 99/275 |
| 2006/0000363 A1 * | 1/2006 | Streeter et al. | 99/279 |

FOREIGN PATENT DOCUMENTS

| | | |
|---|---|---|
| EP | 1 353 591 | 10/2003 |
| JP | 2003 299577 | 12/2003 |

* cited by examiner

*Primary Examiner*—Reginald L Alexander
(74) *Attorney, Agent, or Firm*—Barnes & Thornburg LLP

(57) ABSTRACT

Disclosed is a beverage brewer which produces beverage by delivering brewing water to a quantity of brewing substance. The brewer includes a water source for providing water to the brewer. The water source may be in the form of a reservoir or pressurized waterline. A water supply line is provided in the brewer communicating with the water source and a pump. A control is provided for controlling operation of the brewer. The pump transfers water from the water supply line to a heater assembly for heating prior to use in brewing a beverage. A water delivery line communicates with the heater assembly for delivering heated water to a brewing assembly. Brewing substances retained in the brewing assembly and brewing water is received therein for producing a brewed beverage.

21 Claims, 3 Drawing Sheets

APPARATUS, SYSTEM AND METHOD FOR INFUSING A PRE-PACKAGED POD

BACKGROUND

A variety of brewing apparatus have been developed to combine heated water with a brewing substance such as ground coffee or tea material in order to infuse the material and produce a brewed beverage. There are many ways to combine the water with the brewing substance. One way is to place the substance in a filter device such as a disposable filter paper and place the filter paper and brewing substance in a brewing funnel or basket. The water is mixed with the brewing substance in the filter thereby allowing the brewed substance to filter through the paper leaving the saturated brewing substance in the filter paper. The saturated substance and used filter paper can be thrown away.

Another way of brewing beverage is to encapsulate the brewing substance in a filter material. The brewing substance in the filter material provides a convenient package for handling a predetermined quantity of brewing substance. The filter material provides a package or container for the brewing substance. This package allows the brewing substance to be handled prior to brewing and after brewing without complication or mess.

Such brewing substances pre-packaged in filter material are referred to as "pods" or "sachets." Pods can be compressed while packaging in the filter material or left in a generally loose condition. Pods generally have a circular shape with a generally flattened configuration often appearing as a disc or puck. Pods generally range in a size from approximately 45-60 mm and contain approximately 9-11 grams of brewing substance.

The typical pod is used to produce approximately 8 ounces of brewed beverage.

It is desirable to improve the flavor and extraction of the flavors and other components of the coffee or other brewing substances. When brewing a beverage it is desirable to saturate, penetrate, agitate and otherwise engage all of the particles of the brewing substance so as to wash from the brewing substance the desirable flavor characteristics and substances for incorporation into the brewed beverage.

One method of determining the flavor of coffee or any other brewed beverage is by taste. One way of more objectively determining the characteristics is by use of an extraction test. The extraction test requires brewed beverage to be placed in a refractometer which calculates the percentage of solubles. The refractometer produces a number which can then be compared to an established scale calibrated to various characteristics.

Another technique for objectively determining the characteristics of a beverage is to perform a uniformity of extraction test. In theory, a properly brewed beverage will uniformly extract solubles, particles and other flavor characteristics from all of the particles of the brewing substance in a generally uniform manner. In practice, extraction generally does not occur in a uniform manner. In other words, some areas of the brewing substance will be extracted to a desired level, some may be extracted below a desired level and some areas may be over extracted. This variety of extractions in different areas of the brewing substance may occur with brewing devices and methods which employ a pod of brewing substance. The pod retains the brewing substance in a generally confined area. As such, the brewing material may not freely agitate within the confinement of the filter material. As a result the water may tend to pass directly from the top of the pod, collecting solubles as it passes through the pod and exiting through the bottom of the pod in a generally vertical path. This flow pattern through the pod may result in some areas being over extracted and other areas being under extracted. Generally, it is acknowledged that pod brewing may produce non-uniform extraction.

When brewing a beverage it may be desirable to increase the volume of the resultant beverage or alter the strength of the beverage. In this regard, it is necessary to increase or decrease the quantity of brewing water which is delivered to the brewing substance. Of course, decreasing the quantity of brewing water will also decrease the quantity of resultant beverage. Depending on the brewing substance, alteration of the brew water volume may also alter the concentration of solubles which are extracted from the brewing substance. For example, by using a smaller volume of brewing liquid only the initial flavor characteristics will be washed from the brewing substance. For example, with coffee, the initial portion of brewing water used to produce brewed coffee may extract the initial flavor characteristics while continued brewing may develop additional oils and flavor characteristics which are more deeply embedded in the cell structure of the coffee bean material. It has been found that the increase in the proportion of ground coffee to water may increase the richness of the brewed coffee. Similarly, decreasing the quantity of water for a given quantity of ground coffee may achieve similar results.

DESCRIPTION OF THE DRAWINGS

The organization and manner of the structure and function of the invention, together with the further objects and advantages thereof, may be understood by reference to the following description taken in connection with the accompanying drawings, and in which.

DETAILED DESCRIPTION

Figure 1:
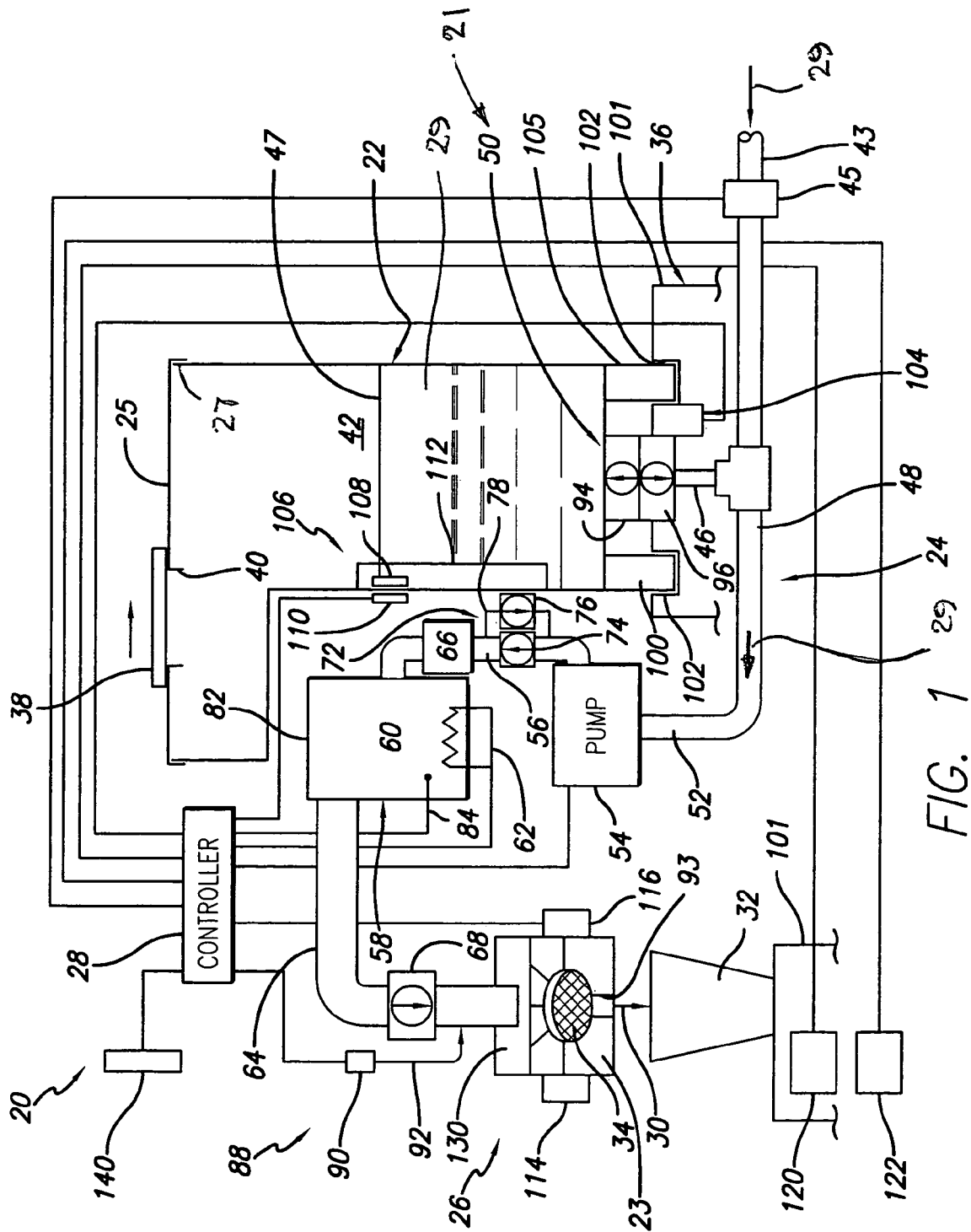
FIG. 1. is a diagrammatic illustration of a brewer as set forth in the present disclosure.

While the present disclosure may be susceptible to embodiment in different forms, there is shown in the drawings, and herein will be described in detail, embodiments with the understanding that the present description is to be considered an exemplification of the principles of the disclosure and is not intended to be exhaustive or to limit the disclosure to the details of construction and the arrangements of components set forth in the following description or illustrated in the drawings.

A brewer 20 is shown. Including, at least in part, a water source 21, a water delivery system 24, a brewing assembly 26 and a controller 28. In general use, the water source 21 provides a quantity of water 29 for selective and controlled delivery through the water delivery system 24 by operation of the controller 28 to the brewing assembly 26. The water delivered through the brewer produces and dispenses a brewed beverage 30 to an associated container 32, such as a cup.

It should be noted that brewing relates to coffee as well as tea assemblies and that the brew assembly 26 may be used not only to brew a beverage substance 34 retained therein but also to produce heated water for dispensing from the assembly 26 into a cup 32 for other uses.

Terms including beverage, beverage making and brewing as used herein are intended to be broadly defined as including but not limited to the brewing of coffee, tea and any other brewed beverage. This broad interpretation is also intended to include, but is not limited to any process of infusing, steeping, reconstituting, diluting, dissolving, saturating or passing a liquid through or otherwise mixing or combining a beverage substance with a liquid such as water without a limitation to the temperature of such liquid unless specified. This broad interpretation is also intended to include, but is not limited to beverage substances such as ground coffee, tea, liquid beverage concentrate, powdered beverage concentrate, freeze dried coffee or other beverage concentrates, to obtain a desired beverage or other food.

While a "pod" is described herein, it is envisioned that any form of beverage brewing substance device, holder, filter structure or other substance delivery media or vehicle may be used. The present disclosure will also include use of the structures and functions with loose brewing substance such as might be used in a loose substance holder. It is envisioned that the present apparatus, system and method of operation could be utilized with other concentrates such as freeze dried concentrates, gel, liquid, powder or any other form of concentrate which will operate with the disclosed apparatus, system and method as well as equivalents thereof and any modifications which might be required to modify the apparatus, system and method to be used with such other substances, if necessary.

Figure 2:
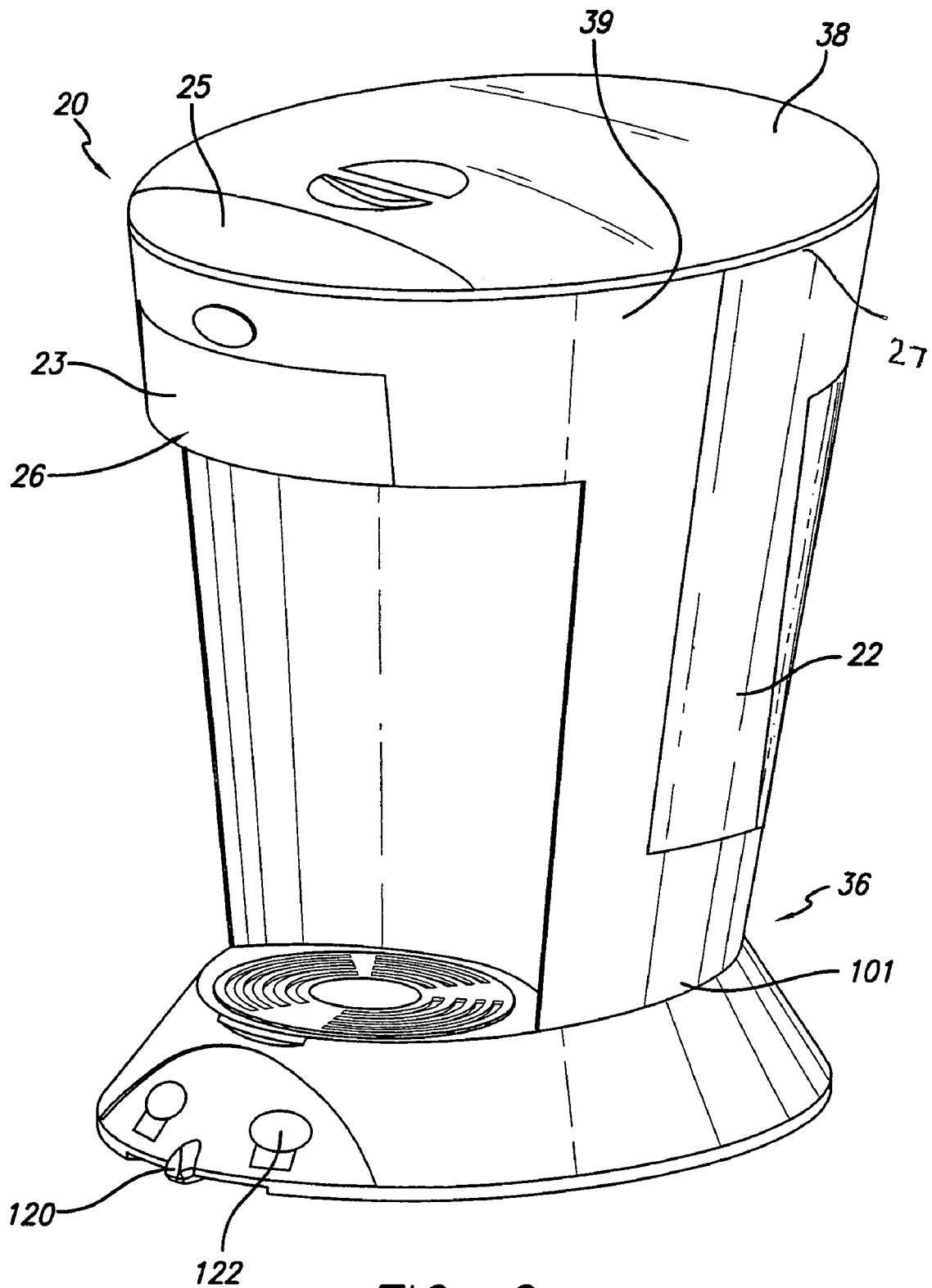
FIG. 2 is an external view of a brewer assembly as disclosed in the present Application.

FIG. 2 shows one embodiment of a brewer 20 employing the systems and methods as illustrated diagrammatically in FIG. 1. In this embodiment, the water source 21 is the form of a reservoir 22 and the brewing assembly 26 is provided on the housing 36. The reservoir 22 defining an open end 27. A displaceably slidable lid 38 is positioned on an upper portion 39 of the housing 36 overlying the open end 27 for opening and closing access to an inlet opening 40 (see FIG. 1) communicating with an internal cavity 42 defined by the reservoir 22. As shown, the water source 21 also may be a plumbed or line pressure connection 43 to directly feed water to the reservoir 22 and/or the water delivery system 24 at an appropriate location. Water can be provided by the line 43 to the reservoir 22 in one embodiment, to fill the reservoir to a desired level. In this embodiment, a controllable inlet valve 45 is coupled to the controller 28 to controllably operate filling of the reservoir 22. In this regard, as described in greater detail below with regard to general embodiments, a water level sensor 106 is provided and coupled to the controller 28. When the water level sensor 106 indicates a sufficient level of 47 water in the reservoir 22, the controller 28 will close the valve 45 to cease filling of the reservoir 22.

With reference to FIG. 1, the water delivery system 24 as disclosed includes but is not limited to several components, structures and features. An entry end 46 of a water supply line 48 is connected to a check valve assembly 50 between the water reservoir 22 cavity 42 and the supply line 48. The check valve assembly 50 functions to allow water to flow from the reservoir 22 to the entry end 46 when the reservoir is positioned on the base 101. When the reservoir 22 is removed from the base 101 as described in greater detail below, the check valve assembly prevents leakage of water from the reservoir and from the entry end 46.

Figure 4:
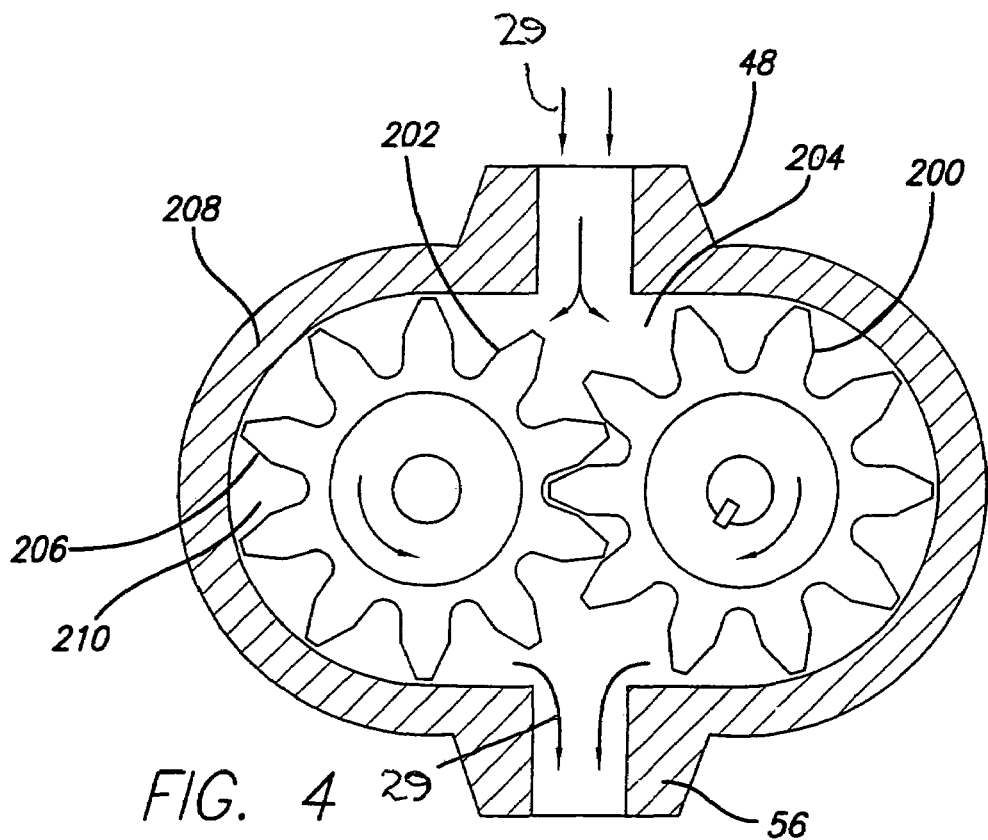
FIG. 4 is a diagrammatic illustration of a gear pump as used in one embodiment as disclosed.

A pump feed end 52 of the water supply line 48 spaced from the entry end 46 connects to a pump assembly 54. The pump assembly 54 as illustrated is a gear pump of known construction. While a gear pump 54 is illustrated in FIG. 4, other varieties of pumps may be used including but not limited to peristaltic pumps, piston pump, wave pumps, diaphragm pumps as well as other pumps which move water from one position to another. The gear pump 54 and operation thereof will be described in greater detail hereinbelow. The pump 54 provides a positive pumping action on water supplied from the reservoir 22 through the supply line 48. Water pumped from the pump assembly 54 is moved through a inlet line 56 to a heater assembly 58. The heater assembly 58 includes a cavity 60 which retains a quantity of water for heating by a heating element 62. The water is passed from the heater assembly 58 through a water delivery line 64. The water delivery line 64 includes an inline check valve 68. Water passing through the check valve 68 is delivered to the beverage assembly 26.

Also included on the inlet line 56 is a flow meter 66 and a check valve assembly 72. Check valve assembly 72 includes at least a pair of check valves 74, 76. A first check valve 74 communicates with the inlet line 56. A second check valve 76 is connected to a side routing line 78. These check valves 74, 76 are provided in parallel and operate in opposite directions such that flow is permitted to move from the pump 54 to the heater assembly 58 through check valve 74. Similarly, some degree of flow is allowed to pass through the side routing line 78 from the heater assembly 58 to the pump 54 through check valve 76. The operation of these check valves 74, 76 in the check valve assembly 72 facilitates the release of pressure downstream of the pump 54 when a brewing cycle ends. However, this check valve assembly 72 also prevents the heater assembly 58 from draining.

The heater assembly 58 includes the heating element 62 retained in a tank or reservoir 82. A thermostatic sensor or thermostat 84 is provided in association with the tank 82. The controller 28 obtains information from the thermostat 84 and controls operation of the heating element 62. While a thermostat 84 is shown and described, any one of numerous types of censors either presently known or to be developed, may be used in place of the thermostat 84 to set the temperature of the water in the reservoir 84.

Also coupled with the water delivery system 24 is a purging assembly 88. The purging assembly 88 includes a controllable air pump 90 coupled to the controller 28 and providing an air line 92 communicating with the downstream end of the water delivery line 64. In use, at the end of a brewing cycle, the controller 28 operates the air pump 90 to provide a purging volume, flow or pulse of air through the air line 92. The air line 92 is positioned between the check valve 68 and the brewing assembly 26 to force the air in the area between the valve 68 and outlet 93 of the brewing assembly to purge water downstream of the check valve 68 through the brewing assembly 26 and out into the cup 32. The pulse of air forced into the water delivery line 64 displaces water in the line and in the pod 34 to help drain water away from the pod. Draining water away from the delivery line 64 downstream of the valve 68 and from the pod helps to reduce or eliminate dripping which may otherwise occur at the end of the brewing cycle.

Figure 3:
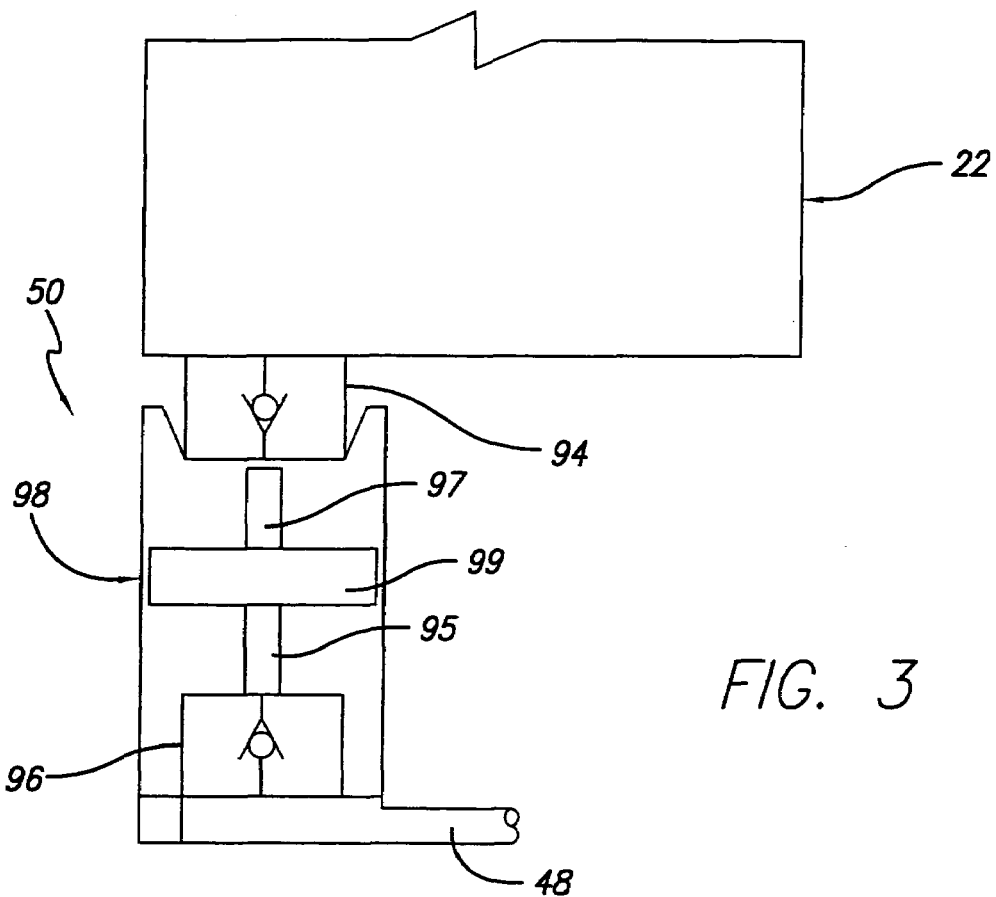
FIG. 3 is an enlarged diagrammatic illustration of a portion of the brewer as disclosed.

As noted above, the reservoir 22 can be configured to be removable from the housing 26 (see FIG. 2). As shown in FIG. 3, the reservoir 22 (shown diagrammatically) includes a reservoir check valve 94, attached to and carried on the reservoir 22. A water delivery system check valve 96 is selectively coupled to the reservoir check valve 94 for allowing the passage of water from the reservoir 22 to the supply line 48. Included in the check valve system 50 is a screen and check valve actuator 98 which engages the respective check valves 94 and 96 and provides a filtering and screening function as well. As shown in FIG. 3, the screen and check valve actuator 98 includes a screen portion 99 and extending actuator portions 97 and 95. The filter 99 provides an additional level of screen of water passing into the system. The extending portions 97, 95 engage the corresponding check valve 94, 96, respectively, to open the check valves when the reservoir 22 is properly positioned on the base 101. When the reservoir 22 is removed from the base, the check valves 94, 96 are disengaged from the portions 97, 95 thereby preventing further flow through the check valves 94, 96.

At least one, and possibly a plurality of locating legs 100 are provided at the lower portion of the reservoir 22. The legs 100 engage corresponding receptacles 102 on the corresponding base portion 101 of the housing 36. In this regard, the legs 100 engage the receptacles 102 to help positively locate the reservoir 22 relative to the check valve system 50. This helps to engage the check valves 94, 96 to provide proper operation of the check valve system 50. The legs 100 also help to position the reservoir 22 in an upright position on a surface when removed from the base 101. The ability to allow the reservoir to stand upright without support when removed from the base 101 is useful to fill the reservoir. For example, when the top cover 25 with the slideable cover 38 carried thereon is removed from the top portion 39 of the brewer the reservoir 22 can be lifted off of the base 101 and removed for filling. The filled reservoir can be returned to the base with the top cover 22 replaced thereover. For additional periodic refills or other uses, the slideable cover 38 can be moved to allow water to be pored through the opening 40.

Additionally, a reservoir detecting sensor assembly 104 is provided with the reservoir 22 and housing 36. The sensor assembly 104 includes a device 105 carried on the reservoir 22 and the housing 36 for detecting proper placement of the reservoir on the housing. The sensor assembly 104 is coupled to the controller 28 for operation as described in further detail below. The sensor assembly 104 may be any form of sensor currently available or hereafter developed for sensing the proper positioning of the reservoir 22 on the base 101 may be used and are fully within the scope of the present disclosure including resistive, capacitive, optical, sonic, as well as any other form of sensing device 104 coupled to the controller 28.

The reservoir level sensor 106 is provided and coupled to the controller 28 to facilitate communication of information about the level of water in the reservoir 22. As diagrammatically illustrated, the reservoir sensor 106 includes a float switch 108 and a sensor 110. Controlled movement of the float switch 108 within a chamber 112 as detected by the sensor 110 indicates the relative level of water in the reservoir 22. The water level sensor 106 operates as will be described in later detail hereinbelow. Other forms of level sensors currently available and hereafter developed may be used and are fully within the scope of the present disclosure including resistive, capacitive, optical, sonic, as well as any other form of level sensing device 106 coupled to the controller 28.

Also provided on the brewing assembly 26 is a mechanical or other form of a lock system 114 and an assembly detecting sensor 116. The assembly detecting sensor 116 indicates whether the conditions of the sensor permit brewing through the brewing assembly 26. The sensor 116 is coupled to the controller 28 for operation as described in greater detail hereinbelow. Also provided on a user accessible control panel are a selectable control 120 and a power switch 122. The switches are coupled to the controller 28 for operation as described herein.

In use, the user selects a desired substance for brewing and places the substance 34 in a drawer or substance holder 23 of the brewing assembly 26. In the embodiment shown in FIG. 2, the drawer 23 is moved outwardly to place the pod within the drawer 23. The drawer 23 is closed positioning the brewing substance pod 34 in position to receive water from the spray head 130 in the brewing assembly 26. Operation of one embodiment of the drawer 23 as referred to hereinabove can be found in related provisional application entitled "Apparatus System and Method for Retaining Beverage Brewing Substance" filed Feb. 6, 2004, Provisional Application No. 60/542,433. Additional information relating to the adjustable control 120 can be found in related provisional application entitled "Adjustable Volume Brewer" filed Nov. 7, 2003, U.S. Provisional Application No. 60/518,039. Additional information related to the spray head system and method for delivering water to the brewing assembly 26 can be found in U.S. Provisional Application entitled "Water Delivery System, Method and Apparatus" filed Nov. 7, 2003, U.S. Provisional Application No. 60/518,411 and U.S. Patent Application entitled "System, Method, and Apparatus for Heating Water" filed Nov. 8, 2004, U.S. Utility application Ser. No. 10/983, 446.

Further details of the configuration and operation of the single-serving brewer 20 can be found in related provisional applications entitled "Apparatus, System and Method for Infusing a Pre-Packaged Pod" filed Feb. 9, 2004 U.S. Provisional Application No. 60/543,370, and "Pod Brewer Design" filed Feb. 10, 2004, U.S. Design application Ser. No. 29/199, 168. Additional information related to beverage making apparatus which uses loose coffee and related devices and methods of use can be found in U.S. Provisional Application entitled "A Beverage Making Apparatus and Method Using Loose Beverage Substances" filed Apr. 2, 2004, U.S. Provisional Application No. 60/560,033. Information about a pod holder with a removable insert can be found in U.S. Provisional Application entitled "Pod Holder with Removable Insert" filed May 28, 2004, U.S. Provisional Application No. 60/575,235. Information about a beverage making apparatus which uses loose coffee and related devices and methods of use can be found in U.S. Provisional Application entitled "A Beverage Making Apparatus and Method Using Loose Beverage Substance" filed Sep. 1, 2004, U.S. Provisional Application No. 60/606,233. Each of the above-referenced applications and subsequent related applications and the materials set forth therein is incorporated herein by reference in its entirety.

In use, the user dispenses a quantity of water into the reservoir through the opening 40 or the reservoir is automatically filled by the plumbed line 43 receiving line pressure from the facility plumbing. Alternatively, the top cover 25 carrying the slideable cover 38 thereon can be removed so that the reservoir 22 can be removed from the base 101. The reservoir can be filled and subsequently returned to the base 101 whereupon the top cover 25 is returned. Upon placement of a brewing substance 34 in the brewing assembly 26, the system checks to determine if the detection sensor 116 senses a brewing assembly 26 properly in place on the brewer. If the controller 28 obtains appropriate information indicating that the brewing assembly 26 is, in fact, closed, the brewing cycle will be allowed to proceed. If the controller 28 detects that the brewing assembly 26 is not closed, the process will be stopped and some form of indicator or other indicia may be provided on a display 140 coupled to the controller 28.

Additionally, the system provides a "wakeup" function whereby when the user is planning to use the system the system is activated when the user removes the drawer 23 from the brewing assembly 26. In this regard, as a user approaches the brewer 20 and removes the drawer 23 to place a new pod 34 therein, removal of the drawer activates the detection censor 116 indicating to the controller 28 that the drawer 23 has been removed. This is programmed into the controller 28 to indicate that a user is planning to use the machine and that the system should wake up the various components if the system has not been used for a predetermined period of time. For example, after the conclusion of a brewing cycle, if the controller 28 does not sense further activity for a predetermined period of time, for example 5 minutes to 48 hours, the system can shutdown the various components. For example, the heater 62 can be deactivated so that the water retained in the tank 82 is not continuously heated. Once the detector 116 detects removal of the drawer 23, the controller 28 will activate the heating element 62 and any other elements required for brewing in order to initiate the brewing cycle. By activating the heater 62 while the user is filling the pod drawer, the apparent warm-up time for the brewer can be decreased. In an embodiment using the controllable inlet valve 45, when the system is woken up, the inlet valve 45 can be activated in response to the level censor 106 to refill the reservoir to a desired level in anticipation of additional brewing. As an additional matter, the level censor 106 can be moved to a higher portion of the reservoir in an automatic brewing embodiment so as to maximize the volume of water that can be retained in the reservoir 22.

Assuming that the assembly 26 is closed or that any indicated error has been resolved, the brewing cycle continues. The user can adjust the control 120 to select the size and/or the characteristics of the brew which is produced by the brewer 20. In this regard, the user can select the volume of water which is dispensed over the brewing substance 34, thereby affecting the overall finished brew product dispensed into the cup. The user adjusts the control 120 coupled to the controller 28 to increase or decrease the quantity of water dispensed to the brewing substance or pod. If the user is using nine gram coffee pods and then switches to eleven gram coffee pods, the user may wish to increase the quantity of water dispensed to the pod to produce a similar finished product. Similarly, if the user uses a smaller pod instead of the larger pod, the user may wish to decrease a quantity of water. Additionally, a user may wish to alter the volume of water dispensed through the pod to affect the strength or flavor of the coffee produced. In this regard, decreasing the quantity of water dispensed to the pod may produce what seems to be a "stronger" cup of coffee as a result of different flavor characteristics being washed from the pod.

The control 120 can be used and programmed to function in conjunction with the controller 28 to vary the characteristics associated with the brewer 20. In this regard, the controller 120 may be used in conjunction with an appropriate program at the controller 28 to adjust the pump speed, temperature, and, perhaps multiple dispensing of water pulses or quantities during the brew cycle. These are some of the factors which can alter the quantity of water dispensed over the coffee, the contact time, the temperature, as well as other factors to influence the resultant characteristics of the beverage 30 produced by the brewer 20.

After the user selects the appropriate adjustment control level using control 120, a start switch is activated 122 to initiate the brewing process. The brewing process initiates operation of the pump 50 as controlled by the controller 28 to pump a desired quantity of water through the supply line 48 and through the inlet line 56 into the heating assembly 58. The heating assembly may include a heated quantity of water heated by the heating element 62. Pumping of water into the heater assembly 58 and the reservoir 82 of the heater assembly 58 results in displacing heated water in the reservoir through the water delivery line 64. Alternatively, the heating assembly 58 can start with preexisting temperature and heat the liquid in the reservoir 28 to a desired temperature as sensed by the thermostat 84. Either way, the controller 28 operates the pump 54 for a pre-determined period of time relating to a quantity or volume of water which must be dispensed to the brewing assembly 26 to produce a desired quantity of brewed beverage.

Additionally, the pump 54 can be intermittently controlled to dispense several smaller quantities of water throughout the brewing cycle to produce a desired brewing result.

During the brewing process, water flows through the water delivery line 64 and into the brewing assembly 26. At the conclusion of the brewing cycle, operation of the pump 54 is ceased whereby the check valve assembly 50 prevents continued flow of water into the pump assembly 54. It should be noted, however, that the valve assembly 72 may allow some back flow from the heater assembly into the gear pump 54 without draining the heated water tank. The check valve 68 on the water delivery line 64 allows water to flow through during the pumping process but prevents continued flow at the end of the pumping process. The purge assembly 88 is operated at the end of the pumping cycle to push a volume of air through the associated water delivery line 64 and through the corresponding brewing assembly 26. This helps to purge liquid in the brewing substance 34 and prevent dripping from the brewing assembly 34 at the end of the brewing cycle.

If the brewing assembly 26 is opened, such as by removal of the drawer 23 during the brewing process, the drawer detect sensor 116 senses this change and stops the brewing cycle. This helps minimize the quantity of water being dispensed through the water delivery system 64 in the event the drawer 26 is opened.

Additionally, at the end of a brewing cycle, the controller 28 will detect whether the sensor 116 has been cycled. This is useful to detect whether the pod 34, which has been used in the previous brewing cycle, has been removed from the assembly 26. If the sensor 116 has been cycled, the controller 28 will assume that the pod has been removed.

If the controller 28 does not detect cycling of the sensor 116, it will assume that the pod has not been removed, prevent the start of a brew cycle, and provide some indicia at the display 140 to indicate to the user that the brew pod needs to be changed. The indicia provided at the display 140 may be in the form of lights, audio responses, visual displays or any other form of indicia which will indicate the status, operation or other related information associated with the brewer 20.

An example of the gear pump 54 as used in the present disclosure might be the type as provided in B&D Pumps, Inc. of Huntley, Ill. Such gear pumps include, for example, a driving gear and a driven gear 200, 202. The pumps rotate and operate as shown diagrammatically in FIG. 4. The supply line 48 supplies water to the pumps, whereupon it is moved by rotation of the driving gear and driven gear 200, 202 to create an output pressure in the inlet line 56.

The gears 200, 202 come into and out of mesh to produce flow. The driving gear 200 is operated by a controllable motor coupled to the controller 28 to provide a positive drive. Once the gears 200, 202 come out of mesh they create an expanding volume on the inlet side 48 of the pump. Liquid flows into the cavity 204 and is trapped by the gear teeth 206 as they rotate. Liquid travels around the interior of the housing 208 in pockets 210 formed between the teeth 206 and the housing 208. The releasing of the gears on the outlet side 56 tends to force liquid through the outlet port 56 under pressure. Such gear pumps generally provide a constant displacement such that flow is at least generally proportional to the RPM of the drive gear. In one embodiment, the pump 54 is placed at a position which is generally lower than the volume or head of the reservoir 22 to provide a priming action on the pump 54. The head in the reservoir or line pressure from the inlet line 220 provides positive pressure on the pump to prime it for a brew cycle. While the gear pump 54 is a suitable choice, other pumps may be substituted. Gear pumps may be preferable for some applications because they are relatively quiet and provide long life at an affordable component price range.

One of the advantages of a gear pump (as shown and described herein) is that when the pump is stopped, pressure in the heater assembly 58 is allowed to bleed off through the pump 54. This bleeding-off helps to reduce the drip out by reducing the positive pressure at the water delivery line 64 such that the pressure tends to flow back through the gear pump.

While embodiments have been illustrated and described in the drawings and foregoing description, such illustrations and descriptions are considered to be exemplary and not restrictive in character, it being understood that only illustrative embodiments have been shown and described and that all changes and modifications that come within the spirit of the invention are desired to be protected. The applicant has provided description and figures which are intended as an illustration of certain embodiments of the disclosure, and are not intended to be construed as containing or implying limitation of the disclosure to those embodiments. There are a plurality of advantages of the present disclosure arising from various features set forth in the description. It will be noted that alternative embodiments of the disclosure may not include all of the features described yet still benefit from at least some of the advantages of such features. Those of ordinary skill in the art may readily devise their own implementations of the disclosure and associated methods that incorporate one or more of the features of the disclosure and fall within the spirit and scope of the present disclosure.

The invention claimed is:

1. A beverage brewer for brewing a beverage from a quantity of beverage brewing substance. the brewer comprising:
   a reservoir for providing water to the brewer;
   a water supply line communicating with the reservoir;
   a controller for controlling operation of the brewer;
   a pump coupled to the controller and communicating with the water supply line to move water from the supply line, the pump providing pressurization of the water for providing pressurized water for use in the beverage making process;
   a heater assembly coupled to the controller and communicating with the pump for receiving water from the pump;
   a water delivery line communicating with the heater assembly; and
   a releasably sealed brewing assembly for retaining a quantity of brewing substance, the releasably sealed brewing assembly communicating with the water delivery line for receiving pressurized water therefrom;
   the reservoir is removable from the brewer and repositionable on the brewer; and
   a sensor on the brewer and coupled to the controller for detecting at least one of the presence and absence of the reservoir on the brewer.

2. The beverage brewer of claim 1, wherein the pump is a gear pump coupled to the controller.

3. The beverage brewer of claim 2, wherein the gear pump has at least two toothed gears. the gears being retained in a meshed relationship in a housing, a controllable motor driving at least one of the gears for providing a driving force, the motor being coupled to the controller.

4. The beverage brewer of claim 1, further comprising a level gauge operatively associated with the reservoir for detecting at least one of the presence and absence of water in the reservoir.

5. The beverage brewer of claim 1, further comprising the reservoir defining an open end thereof, and a cover overlying the open end of the reservoir.

6. The beverage brewer of claim 5, wherein a slidable lid is slidably retained on the cover for opening and closing access to an inlet opening in the cover, the inlet opening of the cover communicating with the open end of the reservoir.

7. The beverage brewer of claim 1, further comprising at least one leg on the reservoir for retaining the reservoir in an upright position when removed from the brewer and placed on a surface.

8. The beverage brewer of claim 7, further comprising at least one receptacle on the brewer corresponding to and receiving the at least one leg to positively position the reservoir on the brewer.

9. The beverage brewer of claim 1, wherein the water source includes a pressurized line communicating with a controllable valve coupled to the controller. the controllable valve communicating with the reservoir.

10. The beverage brewer of claim 1, wherein the water source includes a pressurized line communicating with the water supply line.

11. The beverage brewer of claim 1, wherein the water source includes a pressurized line communicating with a controllable valve coupled to the controller, the controllable valve communicating with the water supply line.

12. The beverage brewer of claim 1, wherein the water source is a reservoir communicating with the water supply line, the reservoir being removable from the brewer and repositionable on the brewer, a check valve assembly being operatively associated with the reservoir and brewer and selectively communicating with the reservoir and water supply line.

13. The beverage brewer of claim 1, further comprising a check valve communicating with the water delivery line and positioned between the heater assembly and the brewing assembly.

14. The beverage brewer of claim 1, further comprising a purging assembly communicating with the water delivery line downstream of the heater assembly for delivering a volume of air to the water delivery line to facilitate removal of at least some water in the water delivery line after a brewing cycle.

15. The beverage brewer of claim 14, further comprising a check valve communicating with the water delivery line and positioned between the heater assembly and the brewing assembly, the purging assembly communicating with the water delivery line and being positioned between the check valve and the brewing assembly.

16. The beverage brewer of claim 14, wherein the purging assembly includes a controllable air pump coupled to the controller, a check valve communicating with the water delivery line and positioned between the heater assembly and the brewing assembly, the air pump connected to and communicating with the water delivery line between the check valve and the brewing assembly.

17. The beverage brewer of claim 1, wherein the brewing assembly includes a removable substance holder.

18. The beverage brewer of claim 17, wherein the brewing assembly includes a sensor coupled to the controller for detecting at least one of the presence and absence of the removable substance holder.

19. A method of brewing a beverage comprising:
   providing a brewing assembly for retaining a quantity of brewing substance;
   providing a controller for controlling operation of the brewer;

providing a water delivery system including a reservoir coupled to the controller and communicating with the brewing assembly for controllably providing water for brewing to the brewing assembly;

providing a heater assembly coupled to the controller controllable heating water in the water delivery system;

providing a pump coupled to water heater assembly for pressurizing heated water and moving heated water to the brewing assembly for brewing a beverage;

providing a releasably sealable removable substance holder on the brewing assembly for retaining a quantity of brewing substance;

providing a sensor coupled to the controller and operatively associated with the substance holder;

detecting at least one of the presence and absence of the holder on the brewing assembly;

initiating a brewing cycle;

dispensing pressurized brewing water from the water delivery system to the brewing assembly when the sensor detects the presence of the holder;

preventing dispensing of water from the water delivery system to the brewing assembly when the sensor detects the absence of the holder;

providing a sensor on the brewer coupled to the controller for detecting at least one of the presence and absence of the reservoir on the brewer;

operating the controller for dispensing water from the water delivery system to the brewing assembly when the sensor detects the presence of the reservoir on the brewer; and operating the controller to prevent dispensing of water from the water delivery system to the brewing assembly when the controller detects the absence of the reservoir on the brewer.

20. The method of brewing of claim 19, further comprising initiating a brewing cycle; dispensing water from the water delivery system to the brewing assembly when the sensor and controller detect removal of and the replacement of the holder; and preventing dispensing of water from the water delivery system when the sensor and controller detect that the holder has not been removed and replaced.

21. The method of brewing of claim 19, further comprising detecting non-use of the brewer over a predetermined period of time; operating the controller to deactivate at least a portion of the brewer after the predetermined period of time; and operating the controller to reactivate the brewer upon detecting removal of the holder from the brewing assembly.

* * * * *